(12) United States Patent
Stoodley

(10) Patent No.: US 6,470,584 B1
(45) Date of Patent: Oct. 29, 2002

(54) LOCATING ARM FOR A PROBE ON A COORDINATE POSITIONING MACHINE

(75) Inventor: Matthew A Stoodley, Stroud (GB)

(73) Assignee: Renishaw, PLC, Gloucestershire (GB)

( * ) Notice: Subject to any disclaimer, the term of this patent is extended or adjusted under 35 U.S.C. 154(b) by 0 days.

(21) Appl. No.: 09/582,993

(22) PCT Filed: Nov. 26, 1999

(86) PCT No.: PCT/GB99/03931

§ 371 (c)(1),
(2), (4) Date: Jul. 10, 2000

(87) PCT Pub. No.: WO00/33149

PCT Pub. Date: Jun. 8, 2000

(30) Foreign Application Priority Data

Nov. 28, 1998 (GB) .............................. 9826093

(51) Int. Cl.[7] ............................................. G01B 5/004
(52) U.S. Cl. ............................. 33/503; 33/556; 33/558
(58) Field of Search .......................... 33/503, 558, 556, 33/572, 504, 568

(56) References Cited

U.S. PATENT DOCUMENTS

| | | | | |
|---|---|---|---|---|
| 2,332,983 A | * | 10/1943 | Bjorkbom | 33/558 |
| 4,115,923 A | * | 9/1978 | Smith et al. | 33/172 E |
| 4,153,998 A | | 5/1979 | McMurtry | |
| 4,158,919 A | | 6/1979 | McMurtry | |
| 4,335,400 A | * | 6/1982 | Gold | 364/571 |
| 4,401,945 A | | 8/1983 | Juengel | |
| 4,550,418 A | * | 10/1985 | Deis | 33/556 |
| 4,555,857 A | * | 12/1985 | Christoffel et al. | 33/561 |
| 4,559,711 A | | 12/1985 | De Boynton et al. | |
| 4,578,874 A | * | 4/1986 | Juengel | 33/561 |
| 4,621,436 A | * | 11/1986 | Kurimoto | 33/561 |
| 4,658,509 A | * | 4/1987 | Juengel | 33/558 |
| 4,779,319 A | * | 10/1988 | Juengel | 33/558 |
| 4,831,741 A | * | 5/1989 | Sogoian | 33/558 |
| 4,882,848 A | * | 11/1989 | Breyer et al. | 33/559 |
| 4,932,131 A | * | 6/1990 | McMurtry et al. | 33/503 |
| 5,056,235 A | * | 10/1991 | Thomas | 33/558 |
| 5,065,092 A | * | 11/1991 | Sigler | 324/158 F |
| 5,214,858 A | * | 6/1993 | Pepper et al. | 33/558 |
| 5,435,072 A | * | 7/1995 | Lloyd et al. | 33/559 |
| 5,669,151 A | | 9/1997 | Collingwood | |
| 5,671,542 A | * | 9/1997 | Zannis et al. | 33/561 |
| 5,978,748 A | * | 11/1999 | Raab | 33/503 |
| 6,131,299 A | * | 10/2000 | Raab et al. | 33/503 |
| 6,131,301 A | * | 10/2000 | Sutherland | 33/558 |

FOREIGN PATENT DOCUMENTS

| | | | |
|---|---|---|---|
| EP | 0 142 373 A2 | 5/1985 | |
| JP | 357165706 A | * 10/1982 | 33/558 |
| JP | 359073705 A | * 4/1984 | 33/556 |

* cited by examiner

Primary Examiner—Diego Gutierrez
Assistant Examiner—Mirellys Jagan
(74) Attorney, Agent, or Firm—Oliff & Berridge, PLC

(57) ABSTRACT

A probe arm for locating a probe on a machine includes a signal conditioning circuit which produces probe status signals to be sent to the machine. The signal conditioning circuit includes two LEDs mounted on the arm and which are differently coloured to provide a visual indication of probe status e.g. probe ready or probe triggered. One of the LEDs has twice the efficiency of the other and therefore to maintain consistent illumination one is driven with twice the current of the other. Thus by monitoring the current through the LEDs in a sensing circuit at the output terminals of the signal conditioning circuit the status of the probe is communicated to the machine. Power to the probe and signal conditioning circuit is provided from the machine via the output terminals so that only two wires are required to connect the arm to the machine.

6 Claims, 3 Drawing Sheets

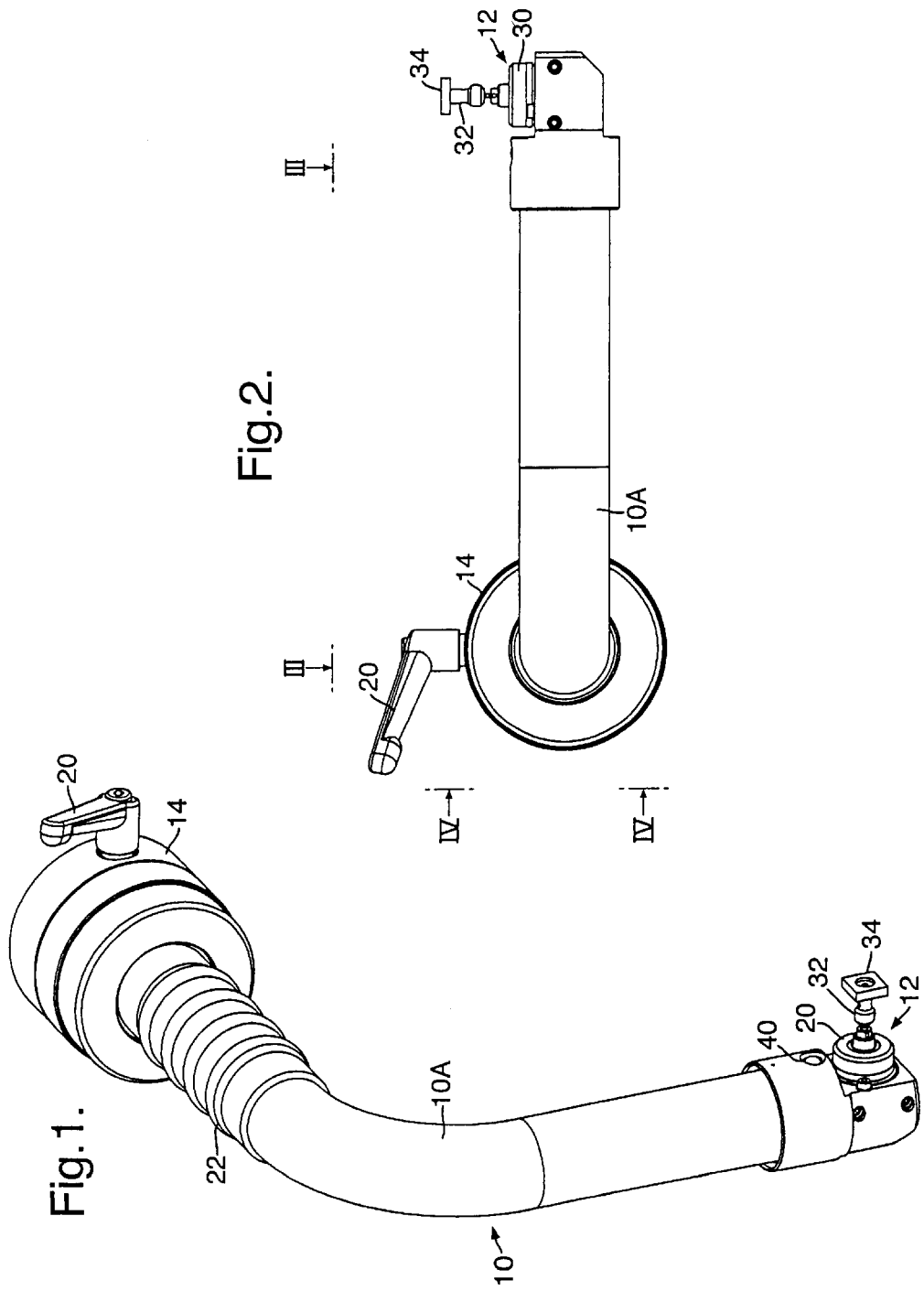

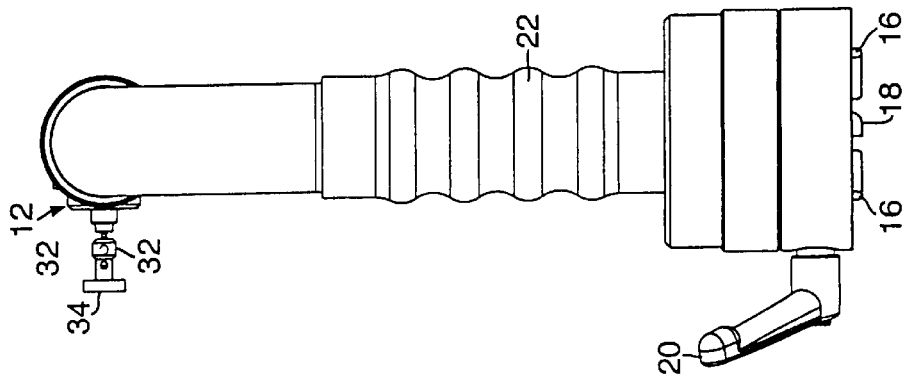
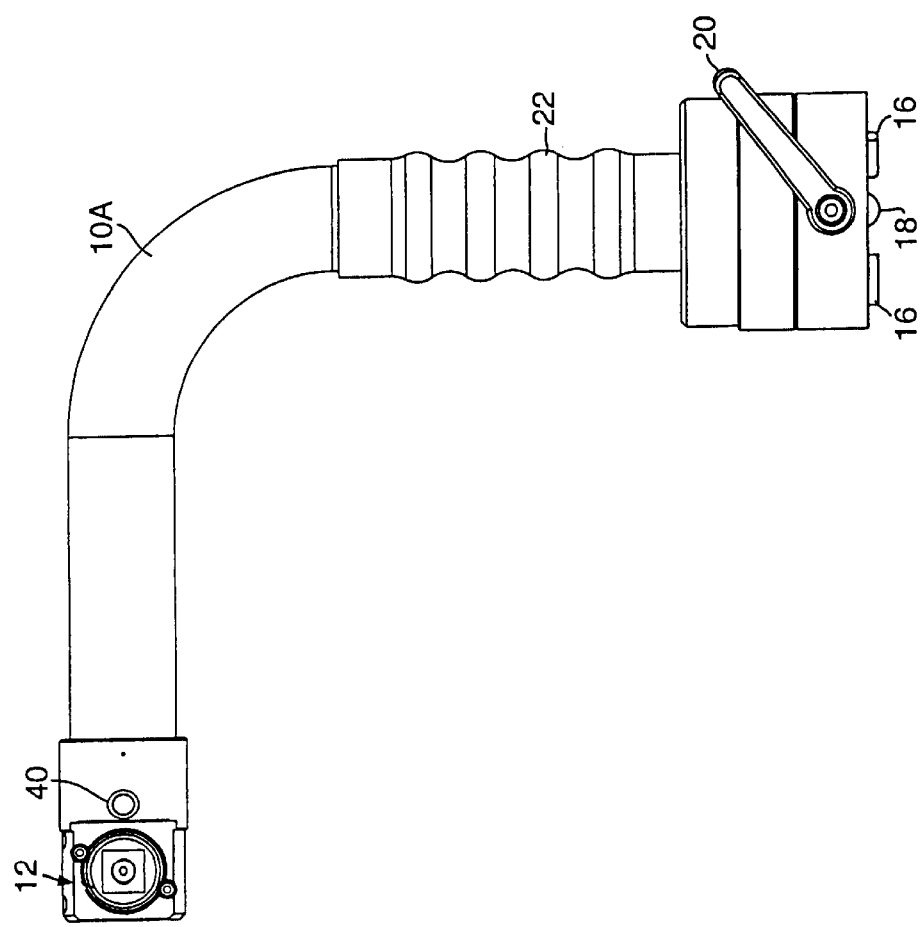

LOCATING ARM FOR A PROBE ON A COORDINATE POSITIONING MACHINE

The present invention relates to an arm for locating a probe on a coordinate positioning machine, such as a machine tool or a coordinate measuring machine.

It is known to locate a probe on a machine tool, for example, by means of an arm which is either manually or automatically removable from the working area of the machine, and whose position (and thus the position of a probe supported on the arm) when situated within the working area of the machine is repeatable. In this way a probe supported on the arm may be positioned within the working area of the machine when required to perform an inspection or toolsetting operation, for example, and then be removed from the working area during machining. Typically, signal connections between the probe and the machine controller (including any interface on the machine which may be required to connect the probe to the controller) are made via the arm, for example by means of cables routed within the arm. Such signals are fed to the control of the machine tool via signal contacts which are operably connected at least when the arm is positioned to locate the probe within the working area of the machine, and which may be broken when the arm is removed from the working area.

According to a first aspect of the present invention, there is provided an arm for locating a probe on a coordinate positioning machine which has indicia provided thereon indicating the status of signals output from the probe.

In one preferred embodiment of the present invention, the indicia are provided by a plurality of light sources, having different colours, with each colour being indicative of a particular probe signal status. For example, one light source may indicate proper connection of the probe to the machine controller, and thus correspond to a status of "probe ready", while another may indicate (in the case of a trigger probe, for example) that probe trigger has occurred.

In a further preferred embodiment, the arm includes a signal conditioning circuit which supplies power to the probe, and receives signals from the probe, the signal conditioning circuit producing, on the basis of the probe signal, a plurality of output signal values, one output indicative of each possible probe status, wherein the signal conditioning outputs are connected to the machine controller and/or interface via the light sources, and each signal conditioning output is identifiable to the machine controller and/or interface from the value of one or more of the parameters of the signals passing through the light sources.

Thus, a change in the signal conditioning output may result in one of the light sources being switched off, and another switched on. By using different coloured LEDs which have different efficiencies and hence use different amounts of current, such a change would be manifested to the machine controller and/or the interface by monitoring, for example, the amount of current consumed by the operating light source.

An embodiment of the invention will now be described, by way of example, and with reference to the accompanying drawings, in which:

FIG. 1 is a perspective view of a locating arm according to an embodiment of the present invention;

FIG. 2 is a view from above of a locating arm according to an embodiment of the present invention;

FIGS. 3 and 4 are side elevations from III—III and IV—IV in FIG. 2; and

Figure 5:
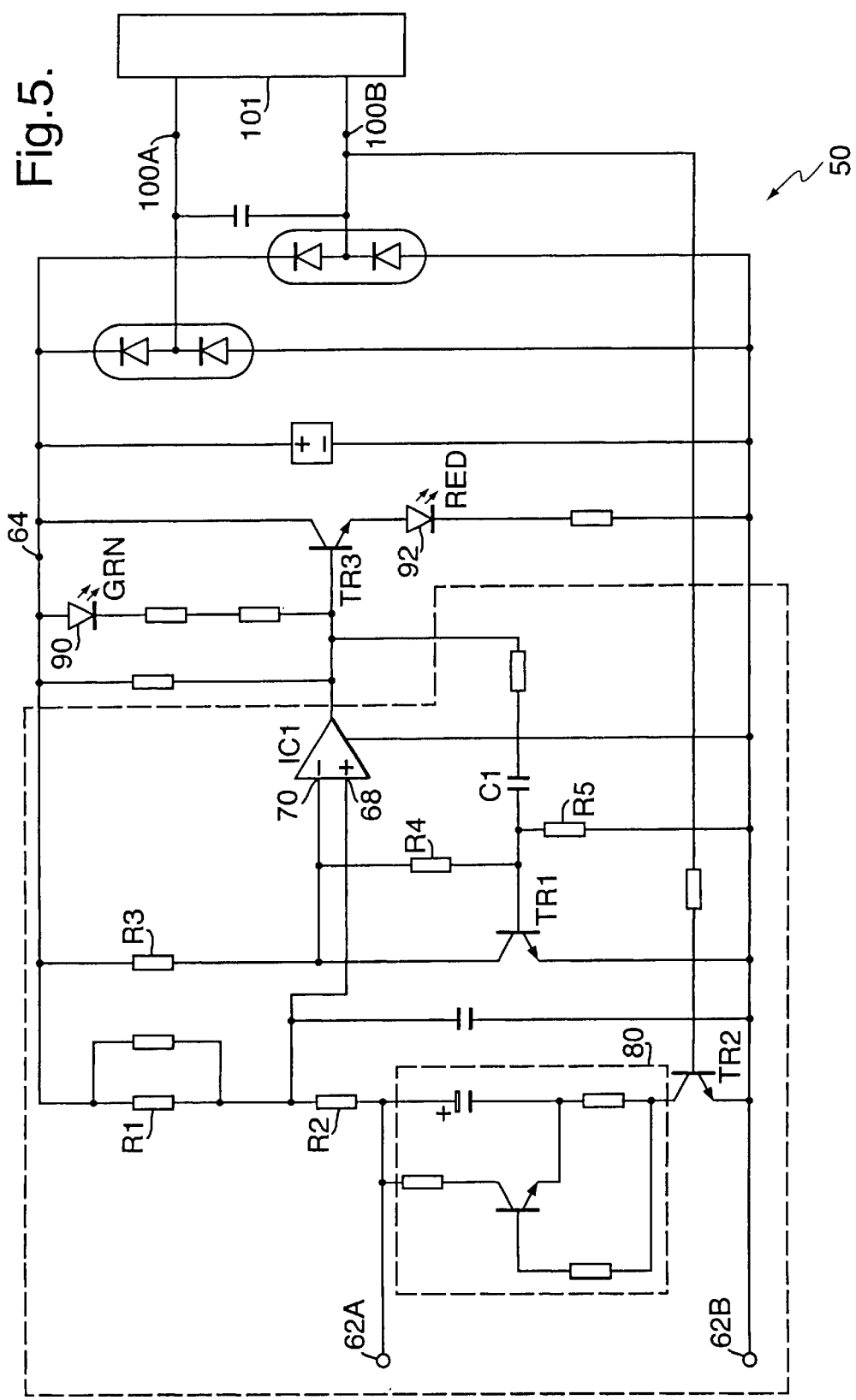
FIG. 5 is a circuit diagram of a circuit incorporated within the locating arm of FIGS. 1 to 4.

Referring now to FIGS. 1 to 4, a locating arm 10 has a right-angle tube 10A which carries a touch probe 12 at one end. The probe, which will be described in more detail later, enables the determination of the position of a surface on a coordinate positioning machine, such as a machine tool, for the purpose of measuring the dimensions of a part, or for toolsetting, for example. The other end of the tube 10A is mounted to a base 14, the underside of which has engagement elements 16, cooperable with a correspondingly configured set of further engagement elements (not shown) situated on the machine to locate the arm 10 thereon. The arm 10 is releasably retained on the machine by the interaction between a cam 18 on the underside of the base 14, with a spigot (not shown) on the machine. Rotation of the cam 18 by means of a lever 20 causes the cam 18 to engage the spigot, thereby urging the two sets of engagement elements into contact, and releasably locating the arm on the machine in a repeatable position in a manner known from our prior published patent EP 0142373 (the disclosure of which is hereby incorporated by reference), and will not be described further. When the arm 10 is mounted to the machine, a pair of electrical contact pins (not shown) which extend from beneath the base 16 connect with a corresponding pair of contacts on the machine (also not shown) to provide an electrical connection between the probe 12 and a controller (and optionally, in the case of certain machine controllers, also with an interface between the arm 10 and the controller).

A hand-grip 22 is provided around a limb of the tube 10A adjacent the base 14, and optionally, a further similar hand grip (not shown) may be provided on the other limb of the tube 10A adjacent the mounting of the probe 12.

In the illustrated example, the probe 12 is a touch-trigger probe of the type shown, for example, in U.S. Pat. No. 4,153,998, although a measuring probe of the type shown in U.S. Pat. No. 4,158,919 could also be supported on the arm 10. The probe 12 has a housing 30 and an elongate stylus 32 projecting from the housing, which has, in this example, a square sensing tip 34 at its free end. The stylus 32 is mounted on a supporting member inside the housing 30 which may deflect when, during the course of a measurement, the probe overtravels the point of contact between the sensing tip 34 and the surface of an object whose position is to be measured. Depending upon the construction of the probe 12, detection of the presence of a surface may occur either on the basis of deflection of the supporting member to a predetermined angle relative to the housing, or on the basis of detection of contact between the sensing tip 34 and a surface.

In each of the above types of probe an analogue signal is generated by the probe which is then converted, by a signal conditioning circuit, into a signal output (trigger) that is identifiable by the machine controller to enable the controller to register the position of the machine at that instant in time. Depending upon the configuration of the machine controller, and the precise nature of the signal conditioning outputs, an interface may be required between the signal conditioning circuit and the machine controller. In the present example the signal conditioning circuit is located inside the arm 10, and the status of the signal conditioning output, and thus the signal from the probe, is indicated by means of a bicolour LED 40, situated on the arm 10 adjacent the probe 12. The LED has a green state, corresponding to a probe status of "ready", and a red state, corresponding to a probe status of "triggered".

Referring now to FIG. 5, a signal conditioning circuit 50 for the output of the probe 12 has a pair of terminals 62A, B which supply current to a detection circuit (not shown) in the probe 12, powered from a supply rail 64 via resistors R1 and R2. Triggering of the probe is defined by the presence of a predetermined resistance level within the probe detection circuit. This resistance level is manifested by the presence of a corresponding predetermined voltage level at an input 68 of comparator IC1, which is connected to what is effectively the output of a potential divider between the resistors R1 and R2. Reference input 70 of comparator IC1 provides a reference voltage corresponding to the predetermined resistance level at which probe trigger is defined, and a stable reference voltage for this input is provided by resistors R3, R4 and R5, together with transistor TR1. A filtering circuit 80, connected in parallel with the signal conditioning circuit terminals 62A, B which supply current to a detection circuit (not shown) in the probe 12, filter out high frequency resistance fluctuations caused, for example, by forced vibration of the probe due to machine motion, which may otherwise result in false trigger of the probe. The filtering circuit 80 is actuated by applying a voltage to the transistor TR2, and operation of the filtering circuit 80 is selectable by switching the connection of the base of the transistor TR2 to the high voltage output terminal 100A, thus allowing the capacitor C1 to charge-up when the resistance in the probe detection circuit increases; switching the base of the transistor TR2 to the low output terminal 100B turns the filtering circuit off. The operation of such a filtering circuit is more fully described in U.S. Pat. No. 5,669,151, the contents of which are hereby incorporated by reference.

The bicolour LED 40 is provided by a pair of diodes 90, 02, which emit green and red light respectively. One of the LEDs has twice the efficiency of the other so that to maintain consistent illumination between the two, one is driven with twice the current of the other. Thus by sensing the flow of current through the LEDs the status of the probe i.e. trigger or untriggered can be determined. For example when the probe is in its untriggered state, the resistance of transistor TR3 (as controlled by the output of the comparator IC1) is such that substantially all the current will pass through the green LED 90, which in the present example draws 20 mA. Upon trigger of the probe 12, the output of the comparator IC1 switches transistor TR3 on, causing the majority of the current flowing to pass through the red LED 92, which in the present example draws approximately 10 mA. Probe trigger is detected at the output terminals 100A, B by a sensing circuit 101 which monitors the voltage across the terminals and hence the current flowing, to determine whether the green or red LED is illuminated. Thus the output of the probe signal conditioning circuit is manifested by monitoring the change in one or more of the parameters of the signals passing through the LED's 90, 92. The sensing circuit 101 preferably forms a part of the probe interface. Further, power is supplied to the arm 10 from the machine through the output terminals 100A, B.

This arrangement enables the provision of only a two wire connection between the machine controller/interface via the terminals 100A, 100B (as the configuration of the controller demands) and the probe, through the arm 10.

What is claimed is:

1. An arm for locating a tool setting probe on a machine tool, comprising:

a pair of contacts on the arm which provide electrical connection between the arm and a machine controller, wherein the machine controller supplies power to the arm;

a signal conditioning circuit located inside the arm to supply power to the probe and to convert a signal generated by the probe into a signal output; and an indicator on the arm which provides a visual indication of the signal output and also provides an indication that is identifiable by the machine controller.

2. An arm according to claim 1 wherein the arm is releasably located on the machine in a repeatable position.

3. An arm according to claim 1 further comprising an interface electrically connected between the signal conditioning circuit and the machine controller.

4. An arm according to claim 1 wherein the indicator for providing said visual indication of the signal output comprises a light source having different colours, each colour being indicative of a particular probe status.

5. An arm according to claim 4, wherein the light sources consume a corresponding different current amount, and where the arm has a sensing circuit capable of sensing changes in the curent amount, and the signal output is identified by the sensing circuit, wherein the sensing circuit monitors one or more parameters of the signal output and communicates the probe status to the machine controller.

6. An arm for locating a toolsetting probe on a machine tool, comprising:

a signal conditioning circuit which supplies power to the probe, and receives signals from the probe, the signal conditioning circuit producing, on the basis of the probe signal, a plurality of output signal values, one output signal value indicative of each possible probe status; and a plurality of light sources providing a visual indication of the probe status wherein the signal conditioning outputs are electrically connected to the machine controller and/or interface via the light sources, and each output signal is identifiable to the machine controller and/or interface from the value of one or more of the parameters of the electrical signals passing through the light sources and the machine controller supplies power to the signal conditioning circuit.

* * * * *